United States Patent [19]

Smith

[11] 4,377,367
[45] Mar. 22, 1983

[54] MOBILE VOTING SERVICE

[76] Inventor: Oscar W. Smith, 2716 Sweetgum, Pasadena, Tex. 77502

[21] Appl. No.: 36,875

[22] Filed: Apr. 3, 1980

[51] Int. Cl.³ .......................... B60P 1/44; B60P 3/00
[52] U.S. Cl. ................................ 414/545; 296/24 R
[58] Field of Search ............ 414/540, 545; 296/24 R; 235/51, 50 R, 50 A, 50 B, 56

[56] References Cited

U.S. PATENT DOCUMENTS

| 499,084 | 6/1893 | Arnold | 296/24 R |
| 1,473,850 | 11/1923 | Greene | 296/24 R |
| 3,697,123 | 10/1972 | Gygrynuk | 296/24 R |
| 4,181,347 | 1/1980 | Clark | 296/24 R X |
| 4,230,358 | 10/1980 | Legueu | 296/24 R |

OTHER PUBLICATIONS

"Wall Street on Wheels", *Automotive Industries*, May 1, 1954, p. 39.

Primary Examiner—James L. Rowland
Attorney, Agent, or Firm—David Alan Rose; Murray Robinson; Ned L. Conley

[57] ABSTRACT

The mobile voting service includes a vehicle having a driving cab and body mounted on a chassis. Preferably four voting booth are disposed inside the vehicle body to take the booths to voters located at various locations such as hospitals, military installations, low income housing areas, nursing homes, industrial plants, businesses, and rural areas to permit them to vote for the candidate of their choice. The vehicle further includes a two-way communication system, office equipment, and a hydraulic lift mounted on the vehicle body adjacent a door opening into the vehicle. The hydraulic lift includes a platform with at least one hydraulic support and hydraulic equipment for raising and lowering the platform with respect to the vehicle body. The hydraulic lift may be used to install the voting booths and office equipment or to permit handicapped voters to enter and exit the vehicle body for voting purposes. The voting vehicle may further include a bathroom and sleeping quarters for the personnel operating the vehicle and voting booths.

15 Claims, 3 Drawing Figures

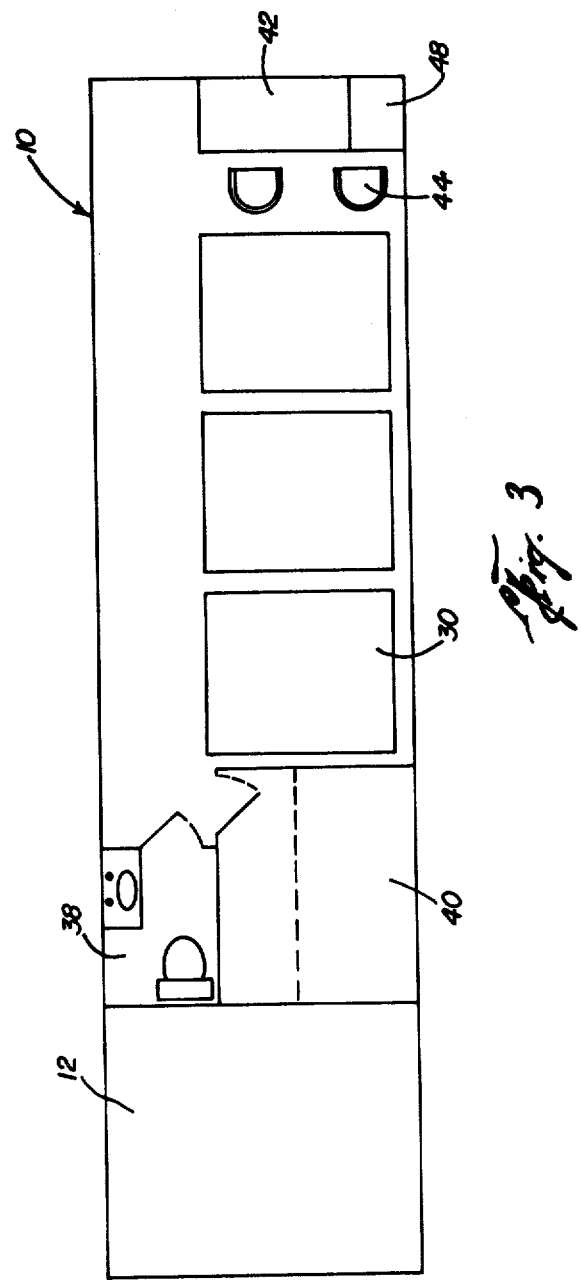

MOBILE VOTING SERVICE

BACKGROUND OF THE INVENTION

It is the fundamental right of every American to vote, and maximum voter participation in the voting process is necessary if this country is to stand the test of time. There is a national need to provide stronger participation and greater voter turnout at elections. Voter apathy in this country has caused alarm at all levels of government and is of major concern in the continuation of a free land and the American heritage. Further, voter apathy is of major concern to individuals, businesses, and politicians seeking public office. Therefore, achieving voter participation in elections is a high priority to all and this can only be accomplished through a change in our voting system, a change that will stimulate growth and will strengthen our constitutional government.

The public's interest in voting needs to be revitalized. Not only must participation at election time be increased, but voter registration and participation in absentee voting be enhanced. Thus, obstacles in getting the voters to the polls to achieve large voter turnout must be removed.

Presently, voters must travel to the polls to vote during an election and must provide their own mode of transportation. Many individuals either do not have an automobile or cannot afford means for transportation to the polls. They only have the opportunity to vote if transportation is provided. There are still many in this country who cannot drive since they do not have a license and therefore they often ignore voting for that reason alone. Sometimes vehicle repair problems prevent the voters from reaching the polls. Also, requiring the voters to seek means of transportation to reach the polls requires the consumption of a substantial amount of fuel for the vehicles.

A huge number of eligible voters do not vote simply because their job responsibilities and activities have priority over voting and therefore they do not go to the polls. Such priority is principally caused by the amount of time required to vote. For example, oftentimes military personnel are involved in field maneuvers which must take preference over voting. Some voters simply are unable to leave their jobs.

Many voters are unable to vote due to illness. For example, voters in the hospital or in other medical facilities such as nursing homes cannot get to the polls. Further, permitting patients to leave the hospital for voting would unduly disrupt hospital routine.

Many voters live in low-income areas and cannot afford to obtain proper transportation to the polls. Many are handicapped, disabled, or are senior citizens.

The inability of certain segments of the voting population to vote creates a favoritism and preference to those who are able to vote. Such favoritism and preference often shows partiality to a particular candidate supported by those voters who are not faced with obstacles in voting.

SUMMARY OF THE INVENTION

The present invention includes a mobile voting vehicle for taking the polls to the voters. The vehicle includes a mobile van having a cab and a body with the body having a door for the entrance and exit of the voters. Four voting booths are secured inside the body and are adapted to permit the voters to vote for the candidate of their choice. Each of the voting booths occupies approximately 36 sq. ft. of floor space in the van. A two-way communication system is disposed within the cab having a communication range of approximately 45 miles. A desk and two chairs are used inside the van for the registration of the voters. Also, a safe is secured inside the body for securing ballot data. A hydraulic lift is provided adjacent the door for raising and lowering the voting booths, office equipment, and handicapped voters to and from the body. The lift includes a platform, at least one hydraulic support extending from the platform to the body, and hydraulic controls for operating the hydraulic support to raise and lower the platform with respect to the body. The mobile voting service includes a plurality of mobile voting vehicles which travel to the voters to permit them to vote in the vehicles. In essence, the polls go to the voters. The mobile vehicles serve as the means for transportation for taking the polls to the voters. Thus, the mobile voting service reaches out to individual voters located throughout the voting area.

Accordingly, a primary object of the present invention is to substantially increase voter interest in the voting process by encouraging voters to register and vote at elections. Thus, voting could be enhanced where previously voter participation was weak and in some cases fruitless.

Another object of the present invention is to create an "on-road" absentee and/or voting service for all registered voters within a voting area. Thus, the polls could reach out to the public and the military in an effort to increase voter registration and voter turnout.

A further object of the present invention is to increase absentee voting.

A still further object of the present invention is to eliminate much of the transportation required to bring voters to the polls. This would substantially reduce fuel consumption. Further, vehicle breakdown problems would no longer be an obstacle to voters.

An additional object of the present invention is to permit those voters who cannot leave their jobs to vote. By bringing the polls to the jobs, the amount of time required to vote is substantially reduced. Further, this would permit individuals in the military who are on field maneuvers to also vote.

An additional object of the present invention is to permit voters who are in hospitals, nursing homes, or other medical facilities to vote. Even those in mental institutions who are classified mentally capable of voting would be permitted to vote since officials would be present to notarize statements attesting to the capabilities of the patients and witnessed by an authorized official or physician at the facility. Further, employees and officials at in-patient medical facilities would not have their duties and responsibilities interrupted by election day.

A further object of the present invention is to provide an equal opportunity for the handicapped, disabled, and senior citizens to vote.

A still further object of the present invention is to permit individuals living in low income areas to vote since the mobile voting service would make the polls available and accessible to their needs.

Another principal objective of the present system is to eliminate many of the major obstacles preventing voters from going to the polls.

Another advantage is the prevention of favoritism and preference of certain segments of the voting population whereby no particular candidate would be favored by a particular segment of the voters not reaching the polls.

These and various other objects and advantages of the invention will become readily apparent to those skilled in the art upon reading the following detailed description and claims and by referring to the accompanying drawings.

The above objects are attained in accordance with the present invention by the provision of a method for using the voting vehicle constructed in any manner substantially as described in the above abstract and summary.

Other objects and advantages of the invention will appear from the following description.

BRIEF DESCRIPTION OF THE DRAWINGS

For a detailed description of a preferred embodiment of the invention, reference will now be made to the accompanying drawings wherein:

FIG. 3 is a schematic plan of the interior of the vehicle of FIG. 1.

DETAILED DESCRIPTION OF THE PREFERRED EMBODIMENT

Figure 1:
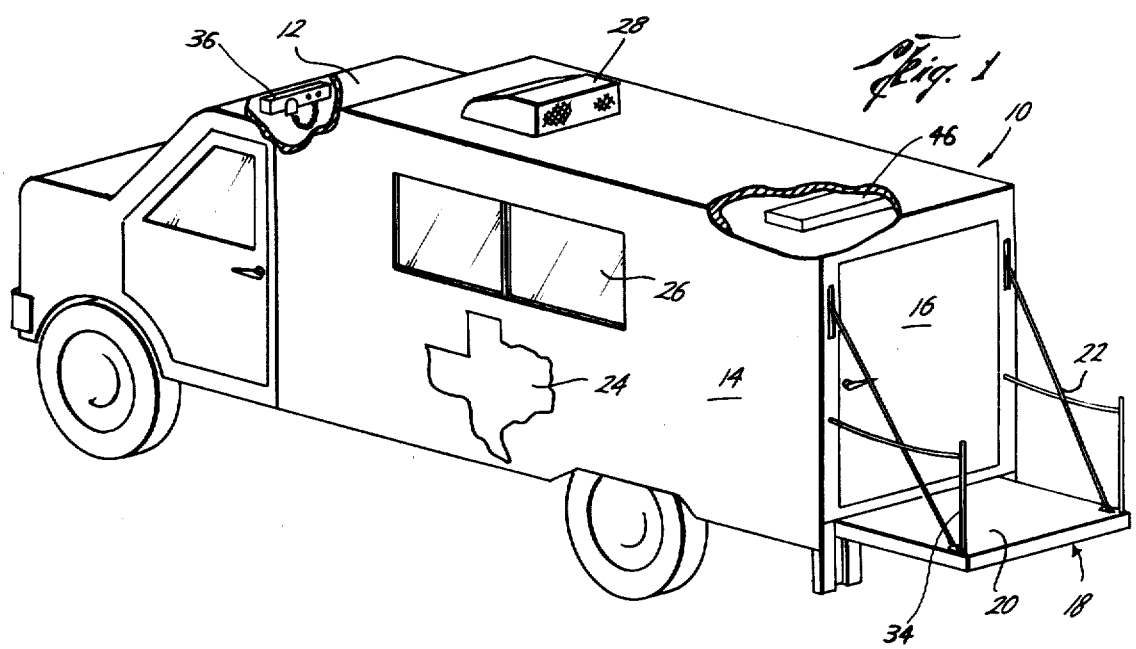
FIG. 1 is an elevation view of a mobile voting vehicle of the present invention.

Referring initially to FIG. 1, there is shown a mobile voting vehicle 10 for taking the polls to the voters comprising a cab 12 and a body 14. Vehicle 10 is approximately 8 ft. wide and approximately 30 ft. long. The body includes a door 16 located either in the side or rear of body 14 for the entrance and exit of voters.

A hydraulic lift 18 is mounted preferably on the back of body 14 although it may be mounted on the side of body 14. Lift 18 is mounted adjacent door 16 so that voting booths, office furniture and handicapped and/or disabled voters may be raised and lowered to and from door 16 of body 14. The hydraulic lift 18 may be used by either individuals requiring assistance such as those who may be ill or those who have difficulty because of age or disability, or for loading and unloading heavy items into the vehicle. The primary functions of lift 18 are to raise and lower voting booths one at a time, to raise and lower the handicapped, and to raise and lower office furniture into the mobile voting facility. Hydraulic lift 18 includes a platform 20, at least one hydraulic support 22 extending from the platform 20 to body 14, and hydraulic controls for operating hydraulic support 22 to raise and lower platform 20 to and from door 16. Hydraulic lift 18 further includes safety features such as safety straps and guard rails 34 to insure the safety of raising and lowering voters into the mobile voting facility.

Cab 12 includes a two-way CB communication system 36 having a communication range of at least 45 miles. Such CB equipment will be capable of receiving and transmitting approximately 45 to 50 miles without any major interference. Weather conditions such as heavy fog, heavy rain, sleet and snow should not create major communication problems. One CB would be provided for each mobile voting vehicle.

The exterior of body 14 is painted a colorful design with an appropriate design emblem 24 on each side, front, and rear of body 14. Example colors would be red, white and blue. Emblem 24 may be of illuminated paint for night vision.

Body 14 would further include appropriate windows 26 and ventilation 28.

Figure 2:
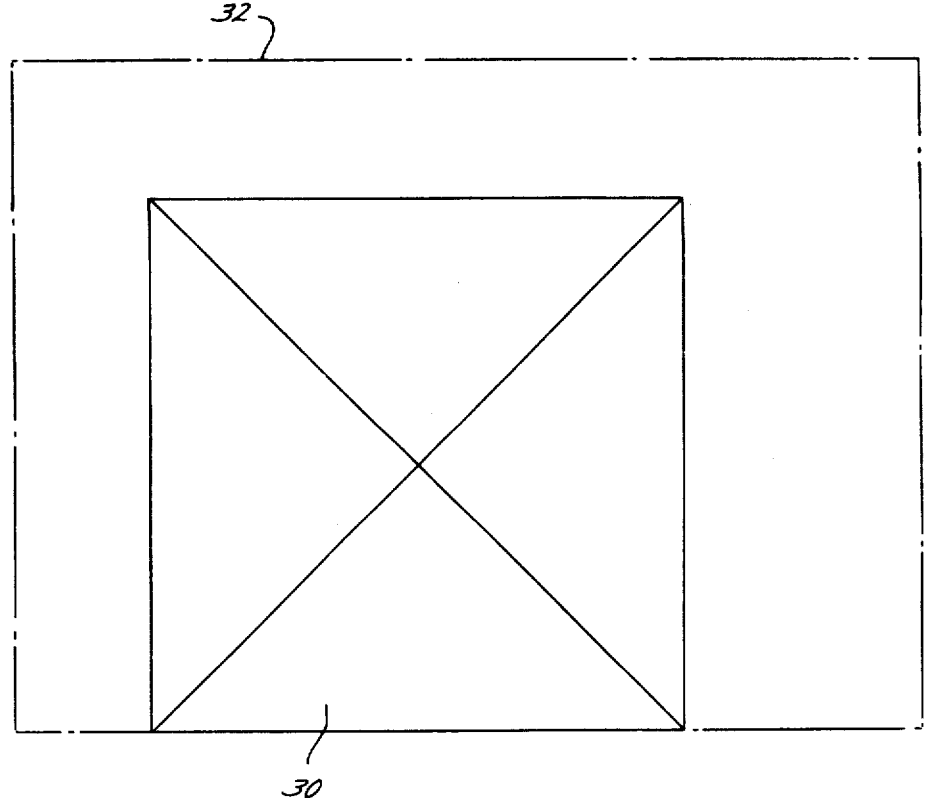
FIG. 2 is a schematic lay-out for a voting booth installed inside the vehicle of FIG. 1.

Referring now to FIG. 2, there is shown a typical floor plan for one of four voting booths 30 securing in body 14. Each voting booth 30 is used for permitting the voters to vote for the candidate of their choice. The voting booth would be an official voting booth and would occupy approximately 36 sq. feet of floor space as shown at 32 for each booth.

The total area required for a voting booth 30 is approximately 36.67 square feet. The voting booth is approximately 4 feet 4 inches square and the area required to permit access during use of the voting machine is an area of approximately 5 feet 10 inches by 7 feet 4 inches. This provides approximately 1 foot in the rear of the voting booth for access to the back of the machine; approximately 18 inches to the side to provide space for access to the officer's latch; and approximately 2 feet in front of the booth for voter access to the booth itself.

Four voting booths would be provided in each motorized voting vehicle. Each voting booth space would be designed to afford adequate space for voting. There would be at least four booths and not less than three, simply because maximum effectiveness of the service could not be accomplished by providing the necessary voting equipment. Voting booths generally are rented and weigh approximately 1,000 lbs. each. The weight consideration must be applied properly in the balancing element of each voting vehicle 10. These booths 30 must be properly installed and secured prior to movement of the vehicle 10.

Referring now to FIG. 3, complete restroom accommodations 38 would be provided within each mobile voting vehicle 10.

Sleeping quarters 40 would also be provided in mobile voting vehicle 10. Complete accommodations for at least three, and as many as four, employees would be provided.

Each mobile voting facility includes an office desk or table 42 to provide voter registration and voter signatures. Two office chairs 44 for the table would also be included. Further, an adequate lighting system 46 would be installed for the table and booths.

An office safe 48, approximately 30 inches high, 22 inches square, and weighing 200 to 400 lbs. would be disposed in the mobile voting vehicle 10 to secure ballot data. The safe would be secured inside body 14 for secure transportation.

The mobile voting service would abide by all state and Federal election codes. Therefore, each mobile voting vehicle would include the required election officials. Each vehicle would include a director, an officer in charge of voting (judge), and at least one, and possibly two, assistants.

The assigned judge at each of the mobile voting vehicles would be fully qualified to supervise each mobile voting facility before being appointed by the director. A radio-telephone operator would also be provided for each mobile voting facility and would have a dual function, i.e., voting assistance and radio-telephone operation. Radio procedures are preferred since such would be required when using the mobile voting vehicle at a distance. Each employee would be paid a salary along with normal benefits such as retirement, vacation, paid holidays, and appropriate medical and life insurance.

Further, consideration would be given to the payment of living expenses during extended use of the mobile voting vehicle.

Additional vehicles such as automobiles would be required to serve as a liaison between all mobile voting vehicles and as administrative liaison between the governmental agency supervising the particular election. Further, these vehicles would be used as liaison between the various voting areas to plan and schedule the service during elections. The use of automobiles instead of the mobile voting vehicles for such purposes reduces the overall fuel consumption required for the utilization of the service. The specific objective of the mobile voting vehicle is primarily that of transporting the voting booths to the voters and to allow the voters to vote within the vehicle in lieu of traveling to the polls. All other transportation needs would be provided for by the vehicle. The automobiles would also include fully equipped CB radios and would have the mobile voting service emblem on each side of their doors.

In a pilot program, the mobile voting service would include as for example ten mobile voting vehicles and six liaison automobiles. The mobile voting service would be advertised to the public to make the public aware of the scheduling and location of the vehicles during registration and election.

The mobile voting service would be assigned various voting areas by precincts or counties and would move throughout the voting area by assigned routes and schedules. The mobile voting vehicle would be scheduled to travel to various locations. For example, the service would be routed through employment areas where employees on the job could vote at their office location as for example banks, manufacturing facilities, chemical plants, department stores, restaurants, barber shops, beauty parlors, malls, plazas, and other business locations. Further, the service would travel to various in-patient medical facilities such as hospitals, nursing homes, institutions for the handicapped, VA hospitals, mental institutions, and other medical facilities. The mobile voting vehicles would also travel through low income areas where low income voters would have an opportunity to vote. Such voters might include the blind, disabled, handicapped, and/or senior citizens. The polls could also be taken to individual voters located a substantial distance from the election locations. Such voters might include farmers and ranchers living in remote locations. This is particularly true in the case of elderly voters living in remote locations. The mobile voting service would also be scheduled to go to military installations where military personnel on field training exercises, bivouac areas, and other military activities would be permitted to vote. Also, the service would be assigned to travel through residential areas moving house to house. In summary, the mobile voting service would travel to the public and military alike to provide them with access to the voting booths. The mobile vehicles would reach out to the public and serve as the means for transporting the polls to the public to permit everyone to vote.

The mobile voting service removes many obstacles now preventing the voters from going to the polls. With the use of the present invention, voters would not go to the polls for lack of transportation, the fuel expense, the distance to the polls, vehicle breakdowns, inability to leave the job, hospitalization, lack of ability to drive, on military duty, or the lack of financial ability. Thus, those voters previously having little interest in elections because of such obstacles, can now register to vote and participate in the voting process itself. Using the mobile voting service, voters need not travel to the polls and use their own mode of transportation since the mobile voting service will bring the polls to the voters. Such a service will encourage voter registration and voter participation in elections. Further, the fuel expenses required for individual voters to travel to the polls will be substantially reduced and will be unnecessary in many instances thus significantly reducing fuel costs.

The service will fulfill the Voters Registration Act by coordinating with the tax accessor offices relating to registration procedures and the registering of the unaccountable number of voters.

Further, the huge number of eligible voters who do not vote simply because of the amount of time required, now can reach the polls simply by using the mobile voting service.

When the mobile vehicles are not in use, such as at night, vehicle storage will be provided such as at a compound for storing the vehicles and for appropriate security. Such vehicle storage areas could be space owned by Federal or state government which are not presently in use. All vehicles would be properly secured during night hours regardless of their location to prevent vandalism. Maintenance of the vehicles would also be provided at the storage areas.

A base-site would be established for the mobile voting vehicles from which the vehicles could manuever in and out at scheduled intervals for use both before, during, and after elections. During elections, this site would be flexible and might include several site areas.

Although the principal function of the present invention is to "reach out" to the public to increase voter participation, one of the other objectives is to increase the registration of the voters and to encourage absentee voting. Thus, the mobile voting service would be used before elections to enhance voter registration and absentee balloting.

Further, the mobile voting vehicles have flexibility in that where they are not being used sufficiently in one voter area, the vehicle can be dispatched to another voting area as need requires.

Any mobile voting service will require a funding for its development and implementation. Any such service would undoubtedly require subsidy by Federal and/or state government. Although the mobile voting service could be privately owned and operated under governmental regulation, funding would better be accomplished through Federal or state assistance. For example, a fund could be instituted for the support of the service with contributions being forwarded directly to the United States Treasury Department and placed in an appropriate account for use in the implementation of the service.

The mobile voting service will combat voter apathy in the United States. By taking the polls to the voters, voter interest will increase and consequently will voter registration and voter turnout at the polls both in urban and rural areas. The service can be expanded beyond county, state, and Federal elections. The mobile voting service could be developed into an international assocation which would be provided to all voters throughout the world. The individual voting procedures and regulations would be governed by the particular governmental entity overseeing the election.

An organization would be created, either as a nonprofit or a profit organization, to support the service.

The operational functioning of the service would consist mainly of a Federal agency supported by the Federal government. Additional support and interest would come from each state and county utilizing the service. Cooperation among governmental entities would provide a complete utilization of the mobile voting vehicles throughout the year so that their use would not be limited to specific elections.

After elections, the mobile voting vehicles may be used to advertise the mobile voting service to obtain a wide range of acceptance of use at the time of elections. For example, the vehicle could be used to establish and insure that businesses are aware of the service so that they will assist in the successful operation of the service in providing a stronger interest in the voting process. The service would also be advertised in urban and rural areas to educate the public concerning the operational procedure of the service. Further, the service would coordinate with military installations to assist in voter registration and election day voting. Set up procedures would be established at various installations and institutions so that the mobile voting service could be made available to all.

It is incumbent on the government to encourage maximum participation by the public in voting. Therefore, much of the responsibility for increasing voter turn-out is with the government itself to accomplish this objective. The mobile voting service will undoubtedly require the creation of a governmental agency to operate the service. Initially a pilot project would be created so that the mobile voting service could be evaluated. The service may initially begin in a major metropolitan area and then later be evaluated for application to rural areas. Local governmental agencies would be the backbone of the service. However, the governmental agency would primarily be responsible for the service and would generally be an independent agency so that its sole objective would be the maximum participation of voters in an election.

While a preferred embodiment of the invention has been shown and described, modifications thereof can be made by one skilled in the art without departing from the spirit of the invention.

I claim:

1. A mobile voting vehicle to take the polls to the voters, comprising:
   a mobile van having a cab and a body, said body having a door in the side for the entrance and exit of voters;
   four voting booths secured inside said body adapted to permit voters to vote for the candidate of their choice, each of said voting booths occupying approximately 36 square feet of floor space in said body;
   a two-way communication system disposed with said cab having a communication range of at least 45 miles;
   a desk and two chairs disposed within said body for the registration of the voters;
   a safe secured inside said body for securing ballot data; and
   a hydraulic lift adjacent said door for raising and lowering said voting booths and handicapped voters to and from said body, said lift including a platform, at least one hydraulic support extending from said platform to said body, and hydraulic controls for operating said hydraulic support to raise and lower said platform with respect to said body.

2. The mobile voting vehicle of claim 1 wherein the exterior of said body is painted with illuminous paint.

3. The mobile voting vehicle of claim 1 wherein each of said voting booths has dimensions of four feet four inches on each side and is secured in said body so as to have a one foot clearance in back for maintenance and a two foot clearance in front for voter access.

4. The mobile voting vehicle of claim 1 wherein said vehicle has an overall width of at least 8 feet and a length of at least 30 feet.

5. The mobile voting vehicle of claim 1 wherein said hydraulic lift has the capability to raise and lower a static load of 1,100 pounds and a working load of at least 700 pounds.

6. The mobile voting vehicle of claim 1 wherein said platform has a length of four feet and a width of four feet.

7. The mobile voting vehicle of claim 1 wherein said hydraulic lift further includes safety devices for preventing an object from falling or rolling off said platform.

8. The mobile voting vehicle of claim 7 wherein said safety devices include guard rails attached to said platform.

9. The mobile voting vehicle of claim 1 wherein said safe is at least 30 inches high, 22 inches square and weighs at least 200 pounds.

10. The mobile voting vehicle of claim 1 further including a lighting system disposed within said body.

11. The mobile voting vehicle of claim 1 further including a bathroom disposed within said vehicle.

12. The mobile voting vehicle of claim 1 further including sleeping quarters disposed within said body.

13. The mobile voting vehicle of claim 1 further including sleeping quarters disposed within said body.

14. The mobile voting vehicle of claim 1 further including a lavatory disposed within said vehicle.

15. The mobile voting vehicle of claim 1 wherein said body includes at least one window and a vent.

* * * * *